(12) United States Patent
Yamauchi et al.

(10) Patent No.: US 7,822,315 B2
(45) Date of Patent: Oct. 26, 2010

(54) EDITING DEVICE, EDITING APPARATUS, AND EDITING METHOD FOR HDTV SIGNAL

(75) Inventors: Hiroshi Yamauchi, Kanagawa (JP); Toshihiro Shiraishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1252 days.

(21) Appl. No.: 10/792,057

(22) Filed: Mar. 3, 2004

(65) Prior Publication Data

US 2004/0233337 A1 Nov. 25, 2004

(30) Foreign Application Priority Data

Mar. 4, 2003 (JP) ............................. 2003-057456

(51) Int. Cl.
*H04N 5/93* (2006.01)
*H04N 9/00* (2006.01)

(52) U.S. Cl. ............................. 386/52; 369/4
(58) Field of Classification Search .................. 386/4, 386/52, 53
See application file for complete search history.

(56) References Cited

U.S. PATENT DOCUMENTS 6,226,038 B1 * 5/2001 Frink et al. ................. 348/443
2002/0168036 A1 * 11/2002 Kim ........................... 375/343
2007/0189709 A1 * 8/2007 Ageishi et al. ................ 386/52

FOREIGN PATENT DOCUMENTS

| JP | 6 187304 | 7/1994 |
| JP | 11 328104 | 11/1999 |
| JP | 2001-197430 | 7/2001 |
| JP | 2002-510924 | 4/2002 |
| JP | 2002-185882 | 6/2002 |
| WO | WO 00/51347 | 8/2000 |

* cited by examiner

*Primary Examiner*—Marsha D Banks Harold
*Assistant Examiner*—Asher Khan
(74) *Attorney, Agent, or Firm*—Frommer Lawrence & Haug LLP; William S. Frommer; Thomas F. Presson

(57) ABSTRACT

An editing device including first and second decoders that decompress the compressed first and second high-definition television video data transferred by a computer; respectively, and edit processing unit for performing edit processing on the decompressed first high-definition television video data and the decompressed second high-definition television video data. A result of edit processing performed by the edit processing means is output. The compressed first high-definition television video data and the compressed second high-definition television video data are transferred in parallel from the computer to the first decoder and the second decoder, respectively.

21 Claims, 11 Drawing Sheets

EDITING DEVICE, EDITING APPARATUS, AND EDITING METHOD FOR HDTV SIGNAL

BACKGROUND OF THE INVENTION

1. Field of the Invention

The present invention relates to an editing device for editing an HDTV (high-definition television) signal by using a computer and to an editing apparatus and an editing method, both of which using a computer, for an HDTV signal.

2. Description of the Related Art

At video-content production departments such as radio stations and post production facilities, content, such as TV programs, commercials, or movies, is commonly produced by editing material, for example, video data and audio data, with nonlinear editors.

As the nonlinear editors, computers (workstations and personal computers) on which editing application software is installed have been conventionally used.

With such a nonlinear editor, material of a desired scene or the like is transferred from, for example, a VTR (video tape recorder) or a video camera, in which material is recorded, and is stored in a storage device connected to a computer or a hard disk built into the computer.

A computer having such editing application software performs edit processing, such as applying a special effect to the loaded/stored material and combining or connecting one piece of material with another to thereby produce video content (e.g., Japanese Unexamined Patent Application Publication No., 2003-37806 (paragraph Nos. 0024 to 0033 and FIGS. 1 and 2)).

Examples of available computer-based nonlinear editors include a device in which a dedicated PCI (peripheral component interconnect) card for performing edit processing (e.g., special effect processing and combining processing) is installed in a PCI slot and loaded/stored material is transferred to the PCI card via the PCI bus so as to be subjected to edit processing.

In recent years, cases in which HDTV signals are edited have been increasing because of the widespread use of digital broadcasting.

An HDTV signal has fourth to fifth times the amount of information of an SDTV (standard-definition television) signal, and data for one frame of the HDTV signal may amount to about 4 megabytes.

When such an HDTV signal, which has a large amount of data, is to be edited with a nonlinear editor using a computer having a dedicated PCI card, at most, only one piece of HDTV video data can be transferred at a time to the PCI card, because of a limited bandwidth of the PCI bus. Thus, a plurality of pieces of HDTV video data cannot be transferred in parallel.

When one piece of data (material) can only be transferred at a time as described above, the PCI card cannot perform real-time edit processing for combining or connecting one piece of material with another, even a relatively simple edit processing, such as A/B roll editing.

When a computer-based nonlinear editor is configured such that a CPU in the computer renders an image to allow an HDTV signal to be edited, large amounts of CPU power and time are required. Thus, such a nonlinear editor still cannot edit an HDTV signal in real time.

When dedicated large hardware for edit processing is used in conjunction with a computer to perform edit processing, it is possible to edit an HDTV signal in real time. However, the use of such hardware leads to a more expensive and larger editing system.

SUMMARY OF THE INVENTION

In view of the foregoing situations, an object of the present invention is to allow an HDTV signal to be edited in real time without the use of dedicated large hardware other than a computer.

To achieve the foregoing object, a first aspect of the present invention provides an editing device that is installed in a computer to edit an HDTV signal. The editing device includes a first decoder and a second decoder which decompress respective compressed HDTV video data transferred from the computer, and an edit processing unit for performing edit processing on the HDTV video data decompressed by the first decoder and the HDTV video data decompressed by the second decoder. A result of edit processing performed by the edit processing unit is output.

This editing device includes the first and second decoders which decompress respective compressed HDTV video data, and the HDTV video data decompressed by these decoders are subjected to edit processing by the edit processing unit and the result of edit processing is output.

Thus, in a computer in which this editing device is installed, compressed HDTV video data, rather than uncompressed HDTV video data, can be stored in a storage device or a built-in hard disk, and the compressed HDTV video data can be transferred to the editing device.

Further, since compressed HDTV video data has a smaller amount of data than uncompressed HDTV video data, two or more pieces of compressed HDTV video data can be transferred in parallel, even in a case in which one piece of HDTV video data can only be transferred at a time due to a limited bandwidth of uncompressed HDTV video data.

Thus, two pieces of HDTV video data can be transferred in parallel from the computer to the editing device to allow for edit processing. As a result, an HDTV signal can be edited in real time without the use of dedicated large hardware other than the computer (i.e., without increases in size and cost of the editing system).

Preferably, the edit processing unit includes an effector for applying a special effect to the HDTV video data decompressed by the first decoder, and a combining unit for combining the HDTV video data to which the special effect is applied by the effector and the HDTV video data decompressed by the second decoder.

With this arrangement, edit processing involving a special-effect-applied scene change can be performed in real time.

Preferably, the editing device further includes an output connector for HDTV data. The result of edit processing performed by the edit processing unit is output from the output connector.

With this arrangement, the result of edit processing can be checked in the form of an HDTV image in real time, by displaying the result on an HDTV monitor connected to the output connector.

Preferably, the editing device further includes an encoder for compressing the HDTV video data on which the edit processing is performed by the edit processing mean. The HDTV video data compressed by the encoder can be transferred to the computer.

With this arrangement, the result of edit processing can be stored, as compressed HDTV video data, in a storage device connected to the computer or on a hard disk built into the computer.

Preferably, the editing device further includes a converting unit for converting the HDTV video data on which the edit processing is performed by the edit processing unit into SDTV (standard-definition television) video data. The SDTV video data converted by the converting unit can be transferred to the computer.

With this arrangement, the result of edit processing can also be checked in real time by displaying the result on a computer monitor connected to the computer.

Preferably, the editing device further includes an input connector for uncompressed HDTV data, and selecting unit for selecting one of HDTV video data input from the input connector and the HDTV video data decompressed by the first decoder and for supplying the selected HDTV data to the edit processing unit. The edit processing unit performs edit processing on the HDTV video data selected by the selecting unit and the HDTV video data decompressed by the second decoder.

With this arrangement, not only can compressed HDTV video data be transferred from the computer to the editing device but also uncompressed HDTV video data can be directly input to the editing device from an external unit so as to be subjected to edit processing.

Preferably, the editing device is constituted by at least one PCI (peripheral component interconnect) card.

Wit this arrangement, regardless of a limited bandwidth of the PCI bus, two pieces of HDTV video data can be transferred in parallel from the computer to the PCI cards so as to be subjected to edit processing.

Another aspect of the present invention provides an editing apparatus for an HDTV signal. The editing apparatus includes a computer for transferring compressed first HDTV video data and compressed second HDTV video data, and an editing device. The editing device includes first and second decoders that decompress the compressed first and second HDTV video data, respectively, and an edit processing unit for performing edit processing on the decompressed first HDTV video data and the decompressed second HDTV video data. The result of edit processing performed by the edit processing unit is output. The compressed first HDTV video data and the compressed second HDTV video data are transferred in parallel from the computer to the first decoder and the second decoder, respectively.

This editing apparatus includes the editing device according to the present invention and the computer, in which the editing device is installed, so that two pieces of compressed HDTV video data (the first HDTV video data and the second HDTV video data) are transferred in parallel to the editing device. With this arrangement, as described for the editing device according to the present invention, an HDTV video signal can be edited in real time without the use of dedicated large hardware other than the computer.

Preferably, in the editing apparatus, the edit processing unit includes an effector for applying a special effect to the HDTV video data decompressed by the first decoder, and a combining unit for combining the HDTV video data to which the special effect is applied by the effector and the HDTV video data decompressed by the second decoder.

With this arrangement, edit processing involving a special-effect-applied scene change can be performed in real time.

Preferably, in the editing apparatus, the editing device further includes an output connector for HDTV data, and the result of edit processing performed by the edit processing unit is output from the output connector.

With this arrangement, the result of editing processing can be checked in the form of an HDTV image in real time, by displaying the result on an HDTV monitor connected to the output connector.

Preferably, in the editing apparatus, the editing device further includes an encoder for compressing the HDTV video data on which the edit processing is performed by the edit processing mean, the HDTV video data compressed by the encoder being transferred to the computer.

With this arrangement, the result of editing processing can be stored, as compressed HDTV video data, in a storage device connected to the computer or on a hard disk built into the computer.

Preferably, in the editing apparatus, the editing device further includes a converting unit for converting the HDTV video data on which the edit processing is performed by the edit processing unit into SDTV video data, and the SDTV video data converted by the converting unit is transferred to the computer.

With this arrangement, the result of edit processing can also be checked in real time by displaying the result on a computer monitor connected to the computer.

Preferably, in the editing apparatus, the editing device further includes an input connector for uncompressed HDTV data, and a selecting unit for selecting one of HDTV data input from the input connector and the HDTV video data decompressed by the first decoder and for supplying the selected HDTV data to the edit processing unit. Preferably, the edit processing unit performs edit processing on the HDTV video data selected by the selecting unit and the HDTV video data decompressed by the second decoder.

With this arrangement, not only can the compressed HDTV video data be transferred from the computer to the editing device but also uncompressed HDTV video data can be directly input to the editing device from an external unit so as to be subjected to edit processing.

Preferably, in the editing apparatus, the editing device is constituted by at least one PCI card.

With this arrangement, regardless of a limited bandwidth of the PCI bus, two pieces of HDTV video data can be transferred in parallel from the computer to the PCI cards so as to be subjected to edit processing.

Additionally, still another aspect of the present invention provides an editing method for editing an HDTV signal using a computer. The editing method includes a transferring step of transferring compressed first HDTV video data and compressed second HDTV video data in parallel from the computer to an editing device installed in the computer; and a decompressing step of decompressing, in the editing device, the compressed first HDTV video data and the compressed second HDTV video data which are transferred in the transferring step. The editing method further includes an editing step of performing, in the editing device, edit processing on the first HDTV video data and the second HDTV video data which are decompressed in the decompressing step; and an outputting step of outputting a result of edit processing performed in the editing step from the editing device.

In this editing method, two pieces of compressed HDTV video data (the first HDTV video data and the second HDTV video data) are transferred in parallel from the computer to the editing device installed in the computer.

Further, in the editing devices, the transferred two pieces of HDTV video data are decompressed in parallel, the two pieces of decompressed HDTV video data are subjected to edit processing, and a result of edit processing is output.

With this arrangement, an HDTV signal can be edited in real time without the use of dedicated large hardware without the computer.

In the editing method, preferably, in the editing step, a special effect is applied to the first HDTV video data, and the first HDTV video data to which the special effect is applied and the second HDTV video data are combined.

With this arrangement, edit processing involving a special-effect-applied scene change can be performed in real time.

In the editing method, preferably, in the outputting step, the result of edit processing performed in the editing step is output from an HDTV signal output-connector provided at the editing device.

With this arrangement, the result of editing processing can be checked in the form of an HDTV image in real time, by displaying the result on an HDTV monitor connected to the output connector.

Preferably, the editing method further includes a compressing step of compressing, in the editing device, the HDTV video data on which the edit processing is performed in the editing step. In the outputting step, preferably, the HDTV video data compressed in the compressing step is transferred to the computer.

With this arrangement, the result of editing processing can be stored, as compressed HDTV video data, in a storage device connected to the computer or on a hard disk built into the computer.

Preferably, the editing method further includes a converting step of converting, in the editing device, the HDTV video data on which the edit processing is performed in the editing step into SDTV video data. Preferably, in the outputting step, the SDTV video data converted in the converting step is transferred to the computer.

With this arrangement, the result of edit processing can also be checked in real time by displaying the result on a computer monitor connected to the computer.

Preferably, the editing method further includes a selecting step of selecting, in the editing device, one of HDTV video data input from an uncompressed HDTV data input-connector provided at the editing device and the first HDTV video data decompressed in the decompressing step. Preferably, in the editing step, the HDTV video data selected in the selecting step and the second HDTV video data are subjected to edit processing.

With this arrangement, not only can the compressed HDTV video data be transferred from the computer to the editing device but also uncompressed HDTV video data can be directly input to the editing device from an external unit so as to be subjected to edit processing.

In the editing method, preferably, the editing device is constituted by at least one PCI card.

With this arrangement, regardless of a limited bandwidth of the PCI bus, two pieces of HDTV video data can be transferred in parallel from the computer to the PCI cards so as to be subjected to edit processing.

DESCRIPTION OF THE PREFERRED EMBODIMENTS

Figure 1:
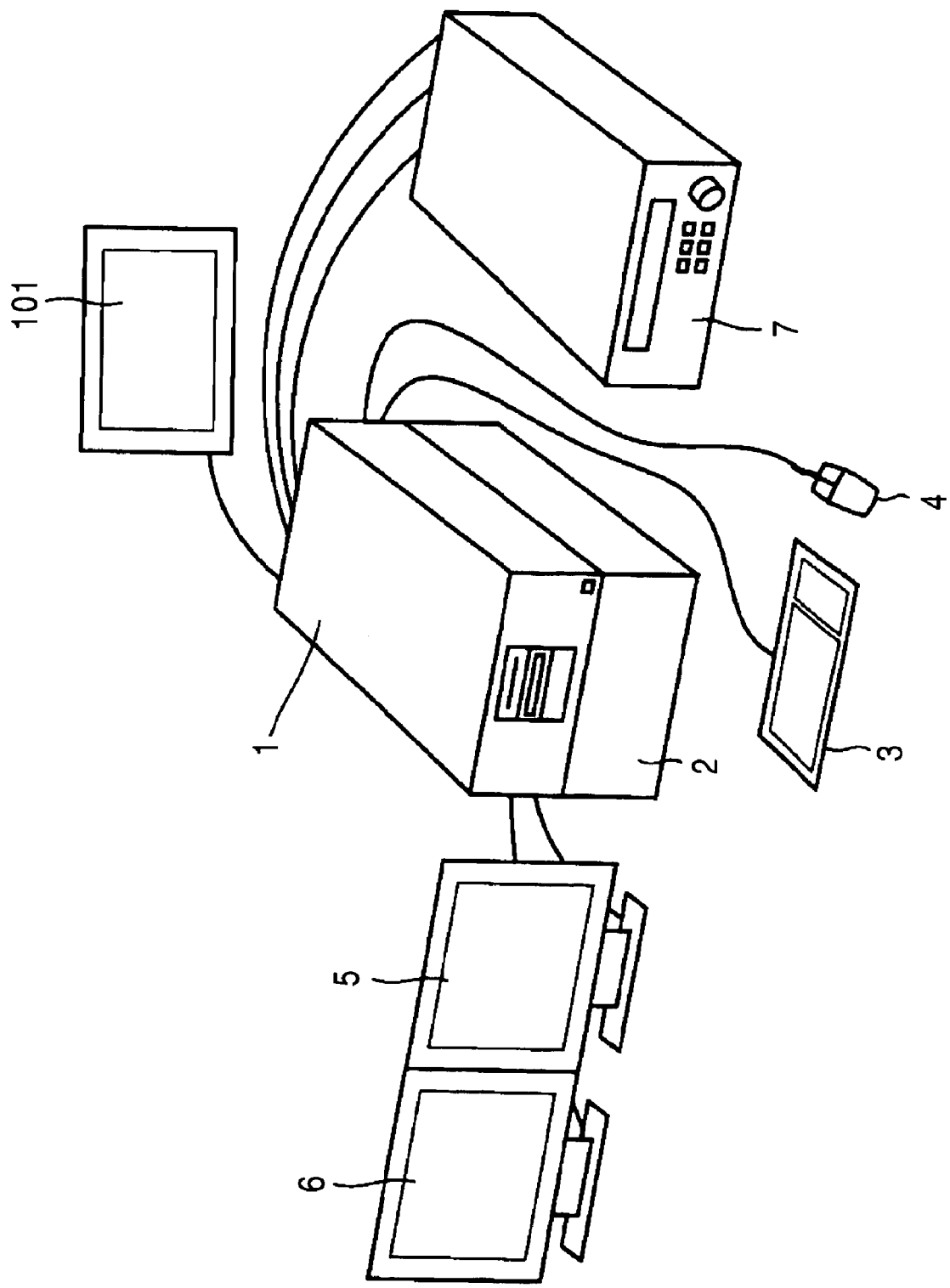
FIG. 1 is a schematic view illustrating the overall configuration of an editing system according to the present invention.

The present invention will be described below in detail with reference to the accompanying drawings. FIG. 1 is a schematic view illustrating the overall configuration of an HDTV-signal editing system according to the present invention. This editing system includes a workstation 1, a storage device 2, a keyboard 3, a mouse 4, VGA monitors 5 and 6, a VTR 7, and an HDTV monitor 101.

Editing application software for capturing and editing material is installed on the workstation 1, and the workstation 1 is used as a nonlinear editor.

An operation screen displayed by the editing application software has operation buttons for allowing loaded/stored material to be edited. The operation buttons include:

(a) a material selection button for selecting two materials to be edited, that is, material A to be subjected to a special effect and material B to be combined with material A, from material stored in the storage device 2;

(b) a special-effect selection button for selecting a type of special effect (e.g., as to a manner of causing a scene of material A to disappear, for example, in a page-turning manner, in a wave-like manner, or in an explosion-like manner) for material A and for setting an effect parameter for a selected special effect;

(c) an editing-result output selection button for selecting displaying a result of edit processing on the HDTV monitor 101, writing the result to the storage device 2, or displaying the result on the VGA monitor 5 or 6.

The storage device 2 is, for example, a large-capacity solid-state disk, and is used as a peripheral storage device when the workstation 1 stores material.

The keyboard 3 and the mouse 4 are input devices for the workstation 1 and the VGA monitors 5 and 6 are output devices for the workstation 1, and these input/output devices are used to operate the workstation 1 to perform an editing task or to check a result of edit processing.

The VTR 7 is a model compliant with an HDCAM format ("HDCAM" is a registered trademark) and is used for recording, in the HDCAM format, uncompressed HDTV data (material) supplied from an HDTV camera or the like at a scene of coverage.

In the HDCAM format, an HDTV signal is compressed by a band-limiting technology or a bit-reduction technology to about one seventh of its original size. This allows a computer to transfer two pieces of HDTV video data, compressed in the HDCAM format, in parallel to PCI cards via a PCI bus.

When the workstation 1 performs a storing operation, of recorded HDCAM-format HDTV, desired HDTV data is transferred from the VTR 7 and is stored in the storage device 2.

The HDTV monitor 101 is connected to a PCI card (not shown in FIG. 1), which is installed in a PCI slot of the workstation 1, and is used to allow for checking of an editing result in the form of an HDTV image.

Figure 2:
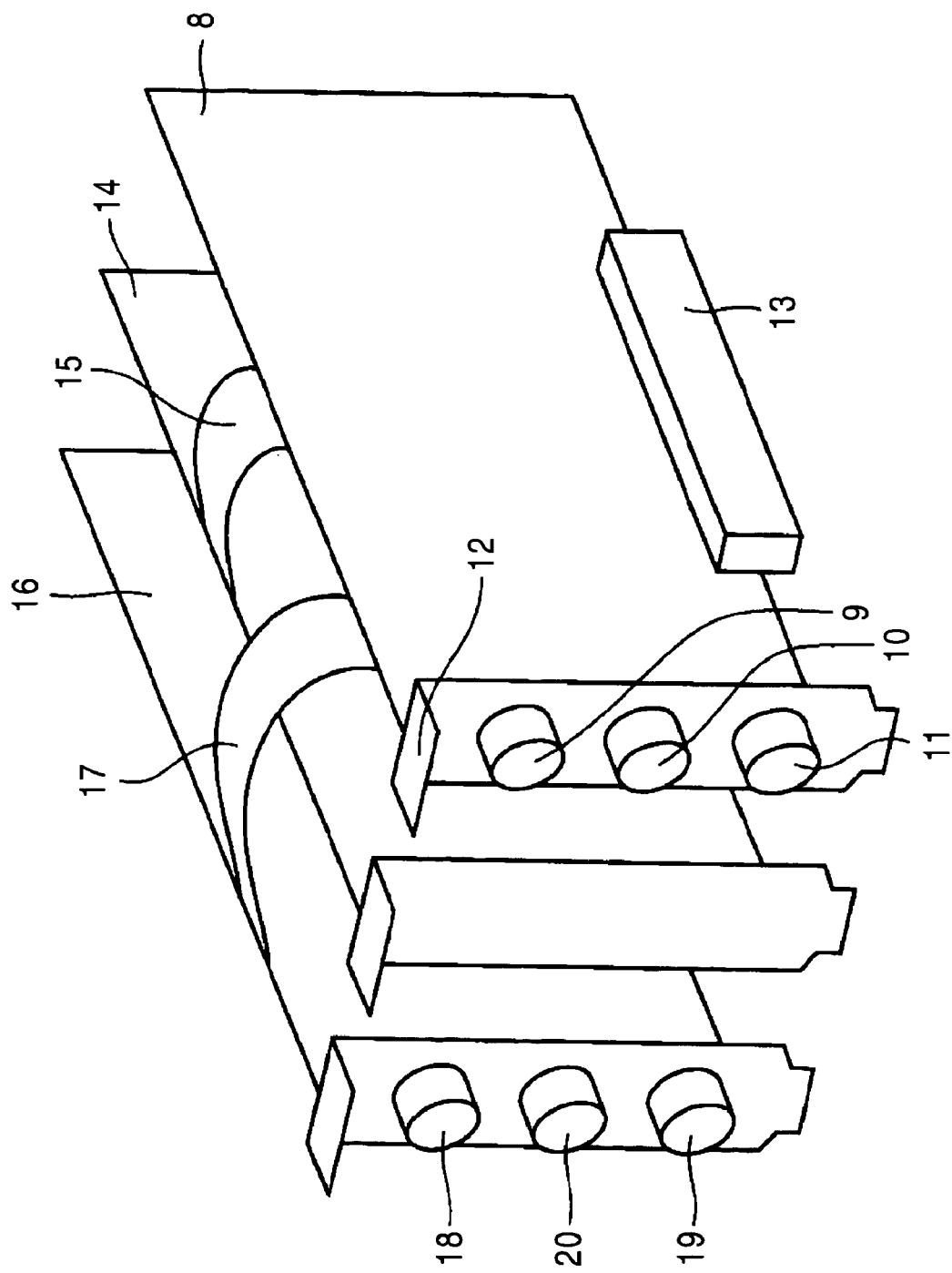
FIG. 2 is a schematic view illustrating the external configuration of PCI cards installed in the workstation shown in FIG. 1.

Three PCI cards are installed in the PCI slots of the workstation 1. FIG. 2 is a schematic view illustrating the three PCI cards 8, 14, and 16.

The PCI card 8 is used to input/output HDTV data and to decode HDCAM-format HDTV video data (hereinafter referred to as "HD compressed data"). The PCI card 8 has a PCI connector 13 for connection with a board (hereinafter referred to as a "motherboard"), which has PCI slots, in the computer, and has a securing-mechanism component 12 for securing the computer with a screw.

The PCI card 8 further has connectors for directly inputting/outputting a signal from/to an external unit without a computer therebetween. Specifically, these connectors may be an input connector 9 for a reference-signal, an input connector 10 for uncompressed HDTV data, and an output connector 11 for decompressed HDTV data. The HDTV monitor 101 shown in FIG. 1 is connected to the output connector 11 of the PCI card 8.

The PCI card 14 is used mainly to input/output HDTV data, to decode HD compressed data, and to perform edit-processing on HDTV data. The PCI card 14 also has a PCI connector 25 (shown in FIG. 3, but not shown in FIG. 2) and a securing mechanism component, which are the same as those of the PCI card 8.

The PCI card 16 is used to input/output SDTV (standard-definition television) data. The PCI card 16 also has a PCI connector 40 (shown in FIG. 3, but not shown in FIG. 2) and a securing mechanism component, which are the same as those of the PCI card 8.

The PCI card 16 further has connectors for directly inputting/outputting a signal from/to an external unit without a computer therebetween. Specifically, these connectors may be an input connector 18 for a reference signal, an input connector 19 for uncompressed SDTV data, and an output connector 20 for decompressed SDTV data.

The PCI cards 8 and 14 have respective connectors 24 and 29 (shown in FIG. 3, but not shown in FIG. 2) for transferring HDTV data therebetween and are interconnected via a cable 15.

The PCI cards 8 and 16 have respective ports 33 and 38 (shown in FIG. 3, but not shown in FIG. 2) for transferring SDTV data therebetween and are interconnected via a cable 17.

Figure 3:
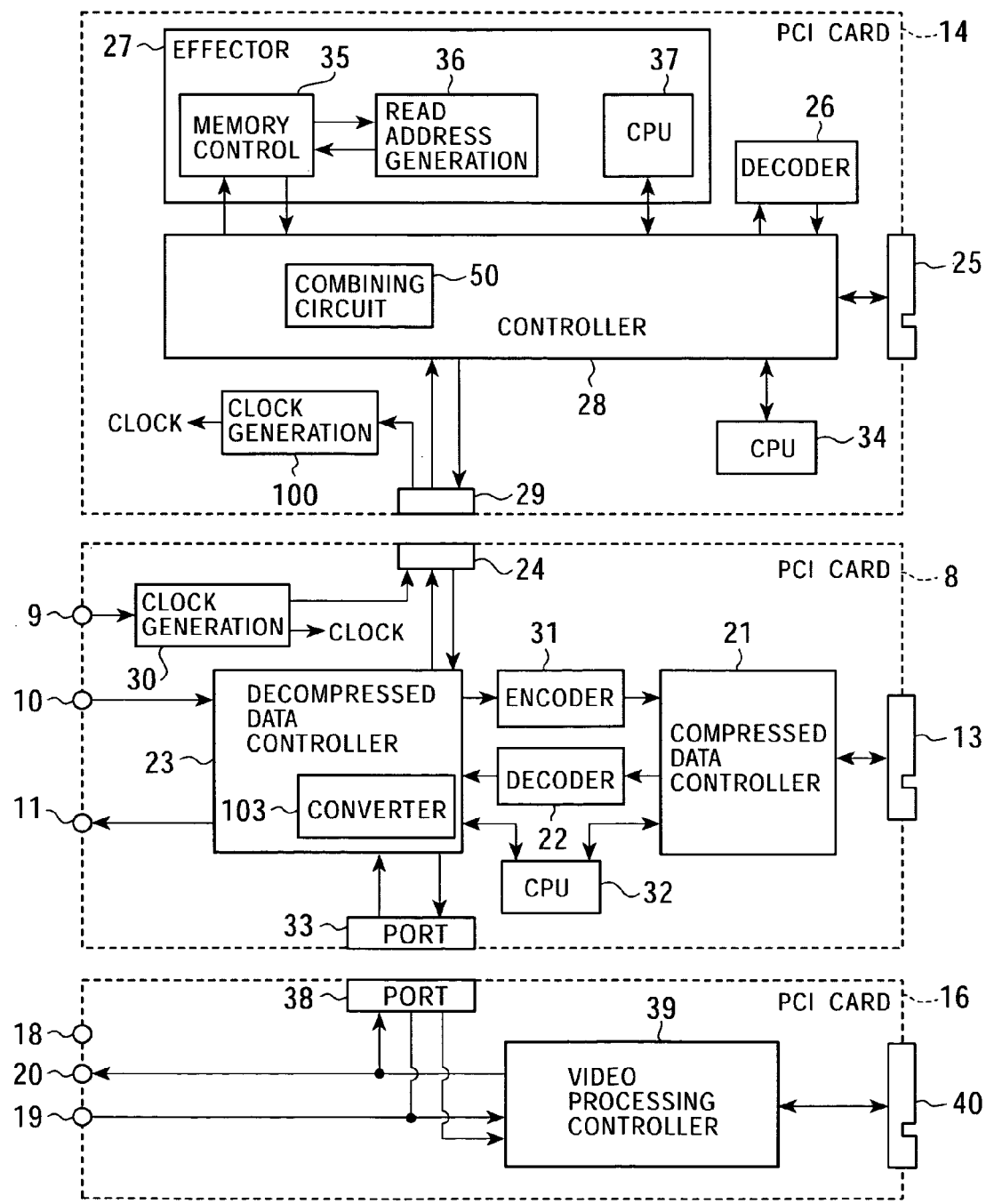
FIG. 3 is a block diagram illustrating the circuit configuration of the PCI cards shown in FIG. 2.

FIG. 3 is a block diagram illustrating the circuit configuration of the PCI cards 8, 14, and 16. The PCI card 8 includes a compressed-data controller 21, a decoder 22, a decompressed-data controller 23, a clock generation circuit 30, an encoder 31, and a CPU 32 for controlling the individual blocks of the PCI card 8.

The compressed-data controller 21 is a circuit for controlling the PCI bus in the workstation 1 and for controlling the input/output of HD compressed data via the PCI connector 13 shown in FIG. 2. HD compressed data input to the compressed-data controller 21 is sent to the decoder 22.

The decoder 22 is a circuit for decoding (decompressing) the HD compressed data into decompressed HDTV video data. The HDTV video data decoded by the decoder 22 is sent to the decompressed-data controller 23.

The decompressed-data controller 23 is a circuit for controlling the input/output of HDTV data via the input connector 10 and the output connector 11 (also shown in FIG. 2) and via the connector 24 (for sending/receiving HDTV data to/from the PCI card 14) and for controlling the input/output of SDTV data via the port 33 (for sending/receiving SDTV data to/from the PCI card 16). Further, the decompressed-data controller 23 includes a converter 103 for converting a signaling system between HDTV data and SDTV data.

The clock generation circuit 30 generates a clock signal based on a reference signal input from the input connector 9, which is also shown in FIG. 2, and supplies the clock signal to the individual blocks of the PCI card 8.

The encoder 31 is a circuit for encoding (compressing) decompressed HDTV video data, sent from the decompressed-data controller 23, into data in the HDCAM format. The encoder 31 then sends the encoded HDTV video data (HD compressed data) to the compressed-data controller 21.

The PCI card 14 includes a decoder 26, an effector 27, and a controller 28, a CPU 34 for controlling the individual blocks of the PCI card 14, and a clock generation circuit 100.

Similarly to the decoder 22 of the PCI card 8, the decoder 26 is a circuit for decoding HD compressed data into decompressed HDTV video data. While not illustrated, the decoders 22 and 26 may be provided on the same board.

The effector 27 is a circuit for applying a special effect to decompressed HDTV video data.

The controller 28 is a circuit for controlling the input/output of HD compressed data via the PCI connector 25 and for sending/receiving HDTV video data to/from the decoder 26, the effector 27, and the connector 29.

The PCI card 16 includes a video processing controller 39. The video processing controller 39 is a circuit for controlling the input/output of uncompressed SDTV data via the PCI connector 40, the input connector 19, the output connector 20, and the port 38 (for sending/receiving uncompressed SDTV data to/from the PCI card 8).

Figure 4:
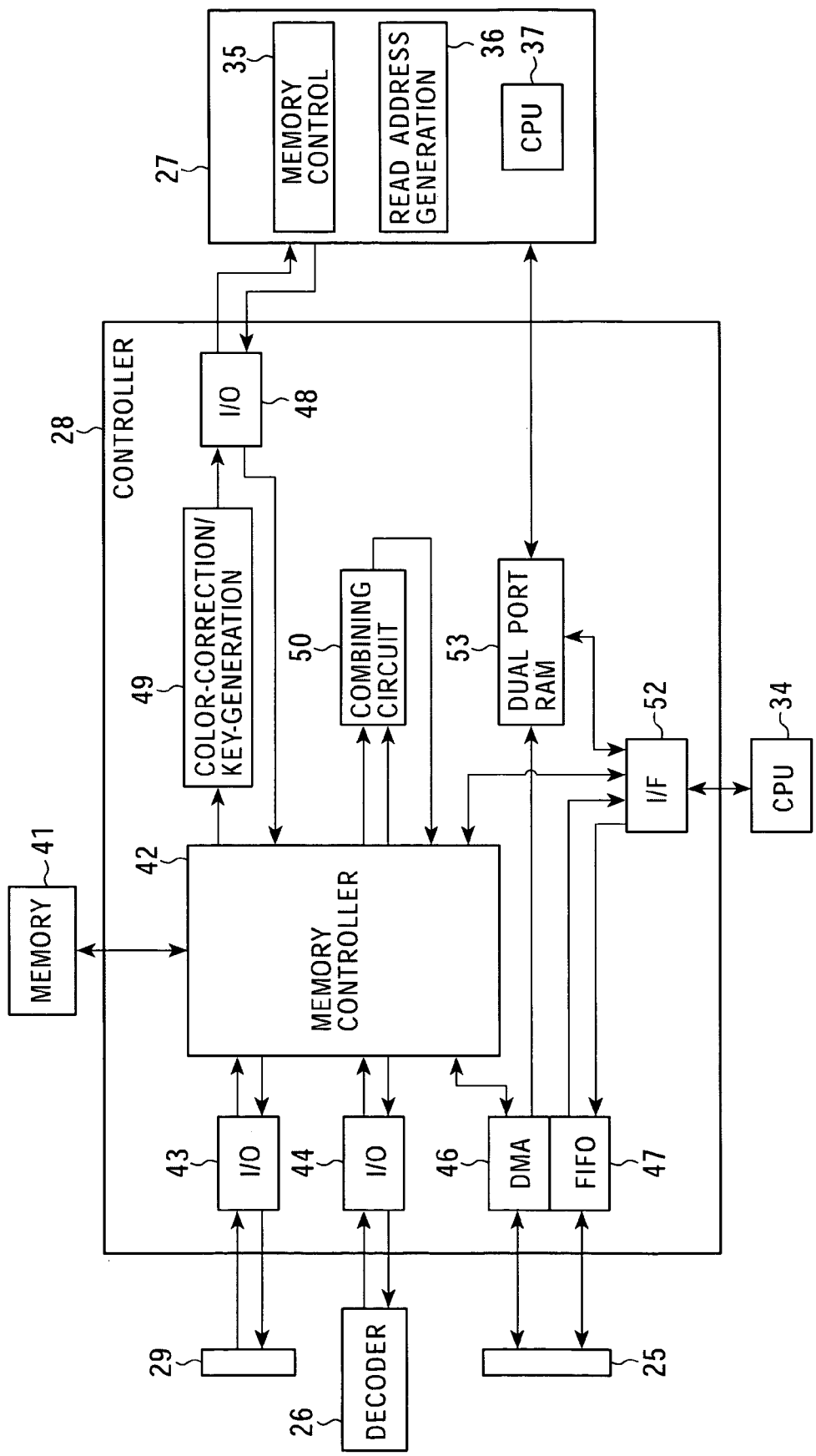
FIG. 4 is a block diagram illustrating the circuit configuration of a controller shown in FIG. 3.

FIG. 4 is a block diagram illustrating the circuit configuration of the controller 28 of the PCI card 14. The controller 28 is connected to a memory 41 (e.g., SDRAM or SRAM), which has a capacity of several hundred megabytes, for temporarily storing HDTV video data. The controller 28 includes a memory controller 42 for controlling the memory 41, an input/output (I/O) ports 43, 44, and 48, a DMA (direct memory access) controller 46, a FIFO (first in, first out) circuit 47, a color-correction/key-generation circuit 49, a combining circuit 50 (also shown in FIG. 3), an interface (I/F) 52, and a dual-port RAM 53.

The input/output port 43 is used for transferring decompressed HDTV video data between the connector 29 and the memory controller 42.

The input/output port 44 is used to transfer HD compressed data from the memory controller 42 to the decoder 26 and to transfer decompressed HDTV video data from the decoder 26 to the memory controller 42.

The input/output port 48 is used to transfer decompressed HDTV video data from the color-correction/key-generation circuit 49 to the effector 27 and to transfer HDTV video data from the effector 27 to the memory controller 42.

The interface 52 is an interface between the CPU 34 and the individual blocks in the controller 28 (connection lines that provide connections between the interface 52 and the individual blocks other than the memory controller 42, the FIFO circuit 47, and the dual-port RAM 53 are not shown).

The DMA controller 46 serves to transfer HD compressed data input via the PCI connector 25 to the memory controller 42 and to write an effect parameter input via the PCI connector 25 to the dual-port RAM 53.

The FIFO circuit 47 is a buffer for sending a command input via the PCI connector 25 to the CPU 34 and for outputting a status, sent from the CPU 34, via the PCI connector 25.

With respect to decompressed HDTV video data sent from the memory controller 42, the color-correction/key-generation circuit 49 performs color correction processing, luminance-key generation processing for generating a key signal (a signal indicating a transparency) from a brightness signal, and chroma-key generation processing for generating a key signal from a specific chrominance component.

In accordance with the key signal, the combining circuit 50 combines two pieces of decompressed HDTV video data sent from the memory controller 42. The HDTV video data combined by the combining circuit 50 is sent back to the memory controller 42.

The dual-port RAM 53 is used to allow a CPU 37 in the effector 27 to read an effect parameter written by the DMA controller 46 and to allow the CPUs 34 and 37 to write/read various types of information to be transferred therebetween.

Figure 5:
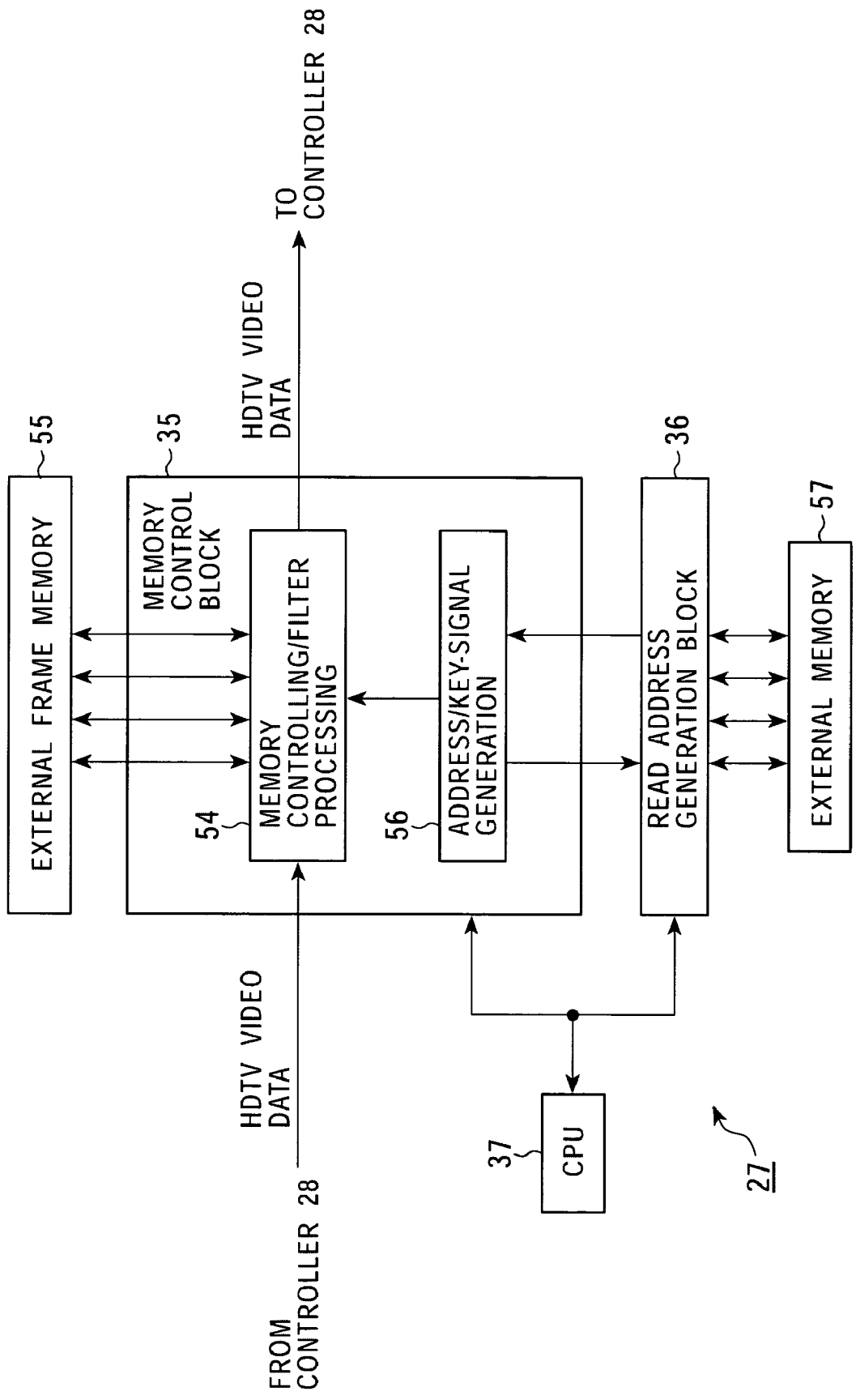
FIG. 5 is a block diagram illustrating the circuit configuration of an effector shown in FIG. 3.

FIG. 5 is a block diagram illustrating the circuit configuration of the effector 27 of the PCI card 14. As also shown in FIG. 3, the effector 27 includes a memory control block 35, a read-address generation block 36, and the CPU 37 for controlling these blocks 35 and 36.

The memory control block 35 is connected to an external frame memory 55. The memory control block 35 includes a memory-controlling/filter-processing circuit 54 and an address/key-signal generation circuit 56.

The memory-controlling/filter-processing circuit 54 controls the external frame memory 55 and performs anti-aliasing by filter processing.

The address/key-signal generation circuit 56 supplies a write or read address for each piece of one-pixel data to the memory-controlling/filter-processing circuit 54, and also generates a key signal indicating a boundary (e.g., a round frame that emerges out of the current scene while showing the next scene and that gradually increases in size) during a scene change and supplies the generated key signal to the memory-controlling/filter-processing circuit 54.

The read-address generation block 36 is connected to an external memory 57. Based on the type of special effect and an effect parameter selected and set with the above-described special-effect selection button, which is displayed by the editing application software installed on the workstation 1, the read-address generation block 36 performs calculations, such as addition, multiplication, and an conversion calculation for polar coordinates in the Cartesian coordinate system, while sending/receiving data to/from the external memory 57 at a speed of 100 MHz or more. Consequently, the read-address generation block 36 generates a read address (X', Y') for each piece of one-pixel data.

When decompressed HDTV video data for one frame is sent from the controller 28 to the effector 27 via the input/output port 48 (FIG. 4), the HDTV video data is sequentially written to the external frame memory 55 via the memory-controlling/filter-processing circuit 54 in accordance with a write address (X, Y) sent from the address/key-signal generation circuit 56.

Then, the read address (X', Y') generated by the read-address generation block 36 is sent to the address/key-signal generation circuit 56 in the memory control block 35. In accordance with the read address (X', Y'), the HDTV video data is sequentially read from the external frame memory 55 via the memory-controlling/filter-processing circuit 54 and is subjected to image-modification processing.

The HDTV video data read from the external frame memory 55 is sent from the memory-controlling/filter-processing circuit 54 to the input/output port 48 in the controller 28.

In this manner, the effector 27 performs processing on HDTV video data for each frame which is sent from the controller 28, so that a special effect, such as causing a scene to disappear in a page-turning manner, is applied to the HDTV video data.

In Japanese Unexamined Patent Application Publication Nos. 2000-122772, 7-059002, and 6-303512 to 303516, the assignee of the present invention has disclosed apparatuses, such as the effector 27, and methods for applying a special effect. In those publications, the circuit configurations, operations, and the like of blocks corresponding to, for example, the read-address generation block 36 are described in detail.

An edit processing operation of this editing system in the present invention will now be described.

[Operation for Transferring and Decoding Material]

First, a description is given of an operation for transferring and decoding material based on the operation of the above-described material selection button on the operation screen displayed by the editing application software installed on the workstation 1.

When material A (material to be subjected to a special effect) and material B (material to be combined with material A) are selected with the material selection button, HD compressed data selected as material A and HD compressed data selected as material B are transferred for each frame, in each time period for one HDTV frame, in parallel to the corresponding PCI cards 14 and 8 (FIG. 3) via the PCI bus.

In the PCI card 8, the transferred HD compressed data for each frame is input to the compressed-data controller 21 via the PCI connector 13. The HD compressed data is then sent from the compressed-data controller 21 to the decoder 22 and is decoded thereby within a time period for a predetermined number of frames (e.g., two frames) The HDTV video data decoded by the decoder 22 is sent, within a time period for a predetermined number of frames (e.g., one frame), from the decoder 22 to the decompressed-data controller 23 and is then sent from the decompressed-data controller 23 to the PCI card 14 via the connector 24.

In the PCI card 14, the HDTV video data sent from the PCI card 8 is input to the controller 28 via the connector 29 and is temporarily stored in the memory 41 (FIG. 4) via the input/output port 43 and the memory controller 42 (FIG. 4).

On the other hand, in the PCI card 14, the HD compressed data for each frame which is transferred from the workstation 1 via the PCI bus is input to the controller 28 via the PCI connector 25.

The HD compressed data is temporarily stored in the memory 41 via the DMA controller 46 (FIG. 4) and the memory controller 42 (FIG. 4), and then the HD compressed data is sent from the memory 41 to the decoder 26 (FIG. 4) via the memory controller 42 and the input/output port 44 (FIG. 4). The data is decoded by the decoder 26 within a time period for a predetermined number of frames (e.g., two frames) and the resulting data is temporarily stored in the memory 41 via the input/output port 44 and the memory controller 42.

[Operation for Special Effect]

An operation for a special effect based on the operation of the above-described special-effect selection button on the operation screen displayed by the editing application software will now be described in connection with the controlling of the PCI card 14 and the CPU 34.

When the selection of a type of special effect and the setting of an effect parameter are performed with the special-effect selection button, an effect starting command is sent from the workstation 1 to the PCI card 14 via the PCI bus and also the set effect parameter is stored in a memory on the motherboard in the workstation 1.

In the PCI card 14, the effect starting command is input to the controller 28 via the PCI connector 25. In the controller 28, the effect starting command is sent to the CPU 34 via the FIFO circuit 47 (FIG. 4) and the interface 52 (FIG. 4).

Upon receiving the effect starting command, the CPU 34 causes the effect parameter stored in the memory on the motherboard in the workstation 1 to be input to the controller 28 via the PCI connector 25 and causes the DMA controller 46 (FIG. 4) to write the input effect parameter to the dual-port RAM 53 (FIG. 4).

Subsequently, the CPU 34 writes a calculation starting instruction, addressed to the CPU 37 in the effector 27, to the dual-port RAM 53.

The CPU 37 in the effector 27 reads the calculation starting instruction from the dual-pqrt RAM 53. The CPU 37 then reads the effect parameter from the dual-port RAM 53, and causes the read-address generation block 36 to calculate a read address of data for each pixel by using the effect parameter.

When the read-address generation block 36 completes the calculation, the CPU 37 writes to the dual-port RAM 53 a status which is addressed to the CPU 34 and which indicates that the HDTV data can be received.

Upon reading the status from the dual-port RAM 53, and the CPU 34 causes the HDTV video data (material A), decoded by the decoder 26 and temporarily stored in the memory 41, to be sent to the color-correction/key-generation circuit 49 (FIG. 4) via the memory controller 42.

The color-correction/key-generation circuit 49 processes the HDTV video data. The CPU 34 then causes the processed HDTV video data to be sent to the memory control block 35 in the effector 27 via the input/output port 48 (FIG. 4).

In the memory control block 35 in the effector 27, the HDTV video data is written to the external frame memory 55 (FIG. 5). The HDTV video data is then read from the external frame memory 55 in accordance with the read address computed by the read-address generation block 36 and is sent to the input/output port 48 of the controller 28.

The effector 27 also performs the above-described processing per one-frame HDTV data within a time period for a predetermined number of frames (e.g., one frame).

The CPU 34 causes the memory controller 42 to temporarily store the HDTV video data, sent from the effector 27 to the input/output port 48, in the memory 41.

[Flow of Overall Edit Processing Operation]

A description is now given of the flow of an overall edit processing operation when the above-described material selection button, the special effect selection button, and the editing-result output selection button are respectively operated and an operation for giving an instruction for starting edit processing is performed on the operation screen displayed by the editing application software.

Figure 6:
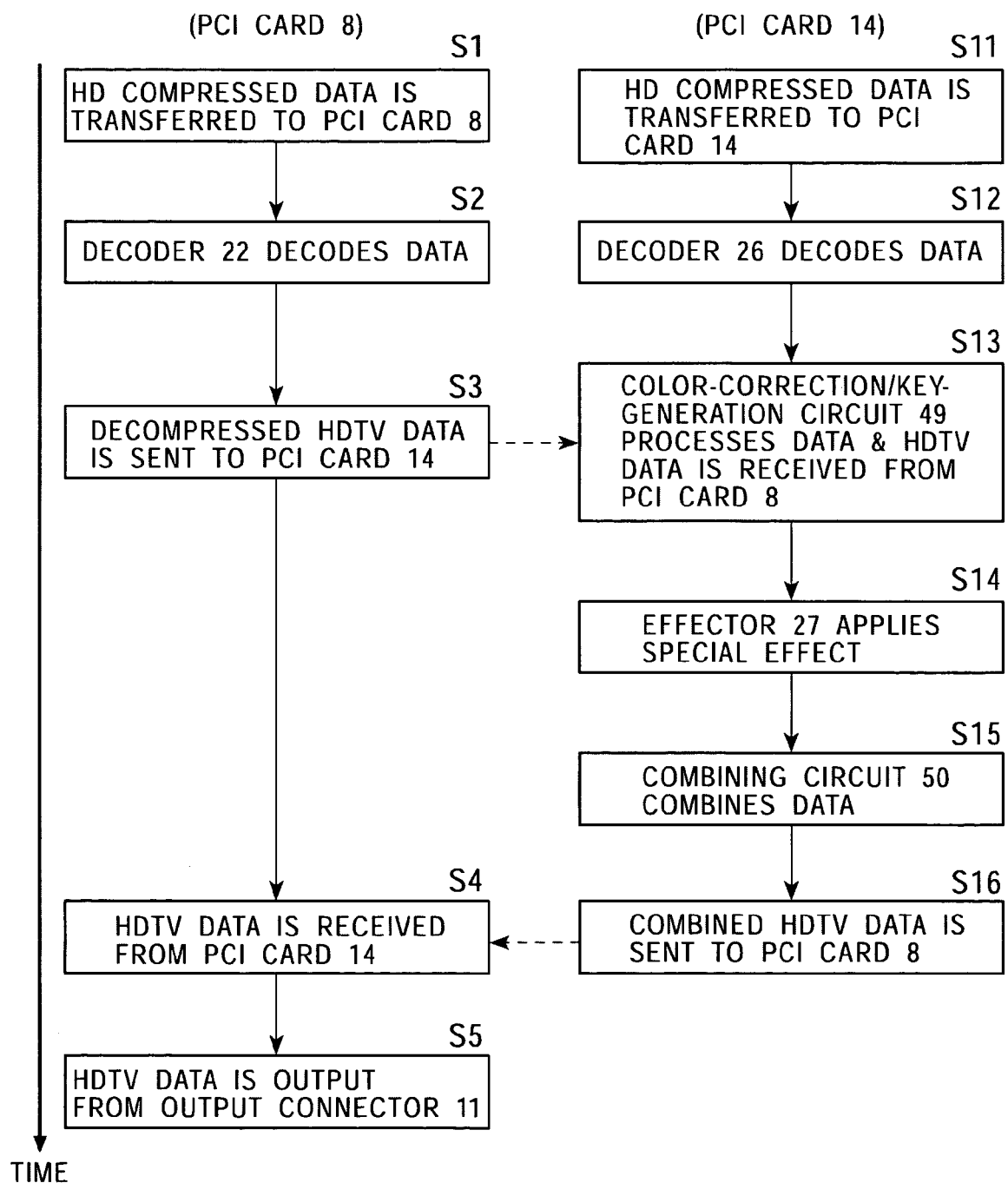
FIG. 6 is a timing chart showing the flow of an overall edit processing operation.

FIG. 6 is a timing chart showing the flow of an overall edit processing operation for material of each frame when a result of edit processing is selected with the editing-result output selection button so as to be displayed on the HDTV monitor 101. The left-hand side in FIG. 6 shows the operation of the PCI card 8 and the right-hand side shows the operation of the PCI card 14.

Figure 7:
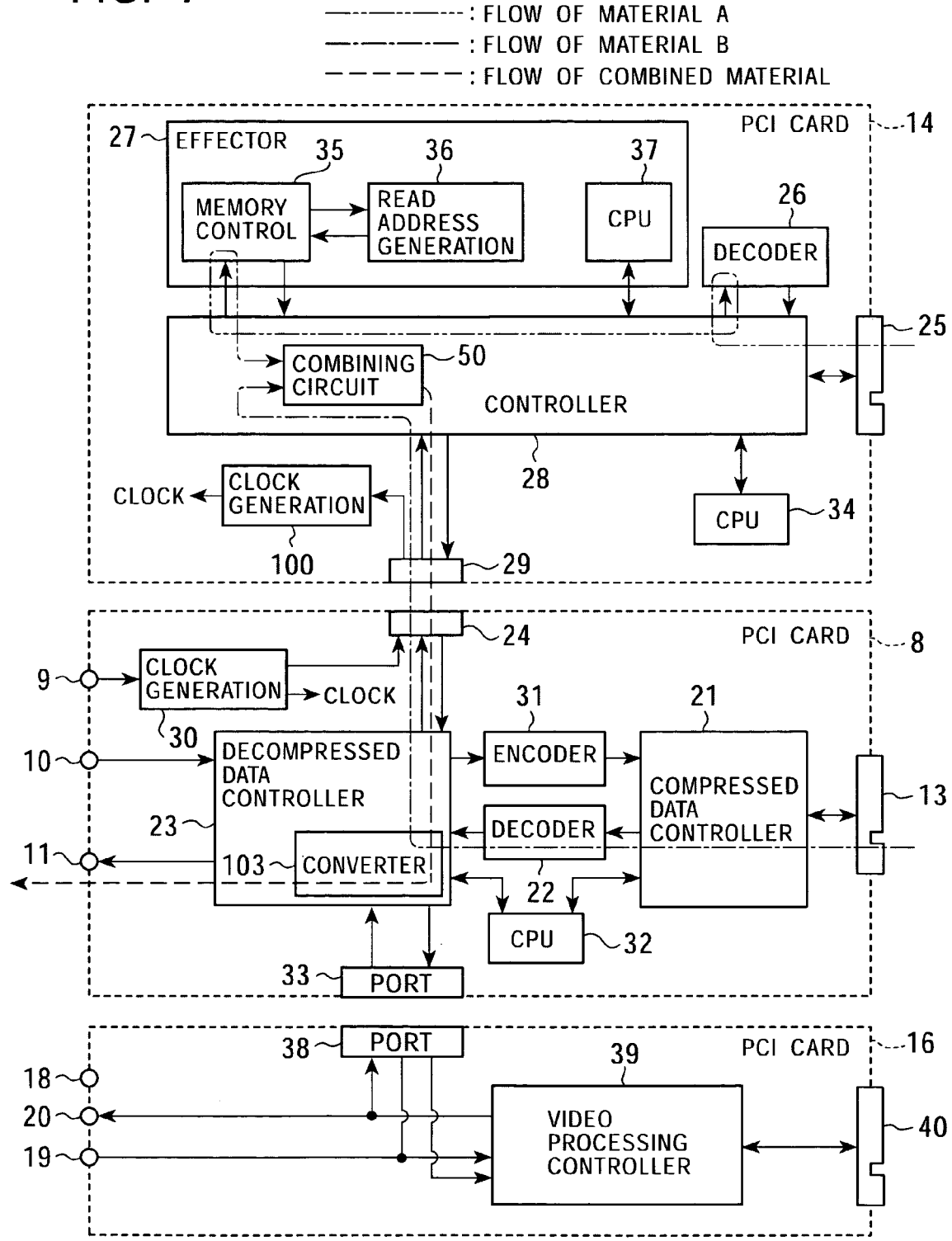
FIG. 7 is a block diagram showing the flow of material in the PCI cards during the edit processing operation shown in FIG. 6.

FIG. 7 is a block diagram showing the flow of materials within the PCI cards 8 and 14 during the edit processing operation shown in FIG. 6. The long dashed double-short dashed line indicates the flow of material A, the dashed-dotted line indicates the flow of material B, and the dotted line indicates the flow of material after materials A and B are combined.

As described in the "Operation of Transferring and Decoding Material", HD compressed data selected as materials B and A with the material selection button are transferred for each frame, in each time period for one HDTV frame, in parallel from the workstation 1 to the corresponding PCI cards 8 and 14 via the PCI bus (in steps S1 and S11 shown in FIG. 6).

In the PCI cards 8 and 14, the transmitted HD compressed data for one frame are decoded in parallel by the corresponding decoders 22 and 26 within a time period for a predetermined number of frames (e.g., two frames) (in steps S2 and S12 in FIG. 6).

The HDTV video data decoded by the decoder 22 is sent from the PCI card 8 to the PCI card 14 within a time period for a predetermined number of frames (e.g., one frame) (in step S3 in FIG. 6).

Within the same time period, the PCI card 14 receives the HDTV video data sent from the PCI card 8. Further, as described in the "Operation for Special Effect", the color-correction/key-generation circuit 49 in the controller 28 processes the HDTV video data decoded by the decoder 26 (in step S13 shown in FIG. 6).

Subsequently, as described in the "Operation for Special Effect", in the PCI card 14, with a time period for a predetermined number of frames (e.g., one frame), the effector 27 performs special-effect processing on the HDTV video data processed by the color-correction/key-generation circuit 49 (in step S14 shown in FIG. 6).

Thereafter, in the PCI card 14, within a time period for a predetermined number of frames (e.g., one frame), the HDTV video data processed by the effector 27 and the HDTV video data received from the PCI card 8 in step S13 are combined by the combining circuit 50 in the controller 28 (in step S15 shown in FIG. 6).

In step S15, specifically, the HDTV video data sent from the effector 27 to the controller 28 and temporarily stored in the memory 41 (FIG. 4), as described in the "Operation for Special Effect", and the HDTV video data sent from the PCI card 8 and temporarily stored in the memory 41, as described in the "Operation for Transferring and Decoding Material", are sent to the combining circuit 50 (FIGS. 3 and 4) via the memory controller 42 (FIG. 4) and are combined by the combining circuit 50. The combined data is then temporarily stored in the memory 41 via the memory controller 42.

Subsequently, the combined HDTV video data (a result of edit processing) temporarily stored in the memory 41 is output, with a time period for a predetermined number of frames (e.g., one frame), from the controller 28 via the memory controller 42 and the input/output port 43 (FIG. 4) and is further sent from the PCI card 14 to the PCI card 8 via the connector 29 (in step S16 shown in FIG. 6).

In the PCI card 8, the HDTV data sent from the PCI card 14 is input to the decompressed-data controller 23 via the connector 24 (in step S4 shown in FIG. 6).

In the PCI card 8, within a time period for a predetermined number of frames (e.g., one frame), the HDTV data is output from decompressed-data controller 23 to the HDTV monitor 101 (FIG. 1) via the connector 11 (in step S5 shown in FIG. 6).

Figure 8:
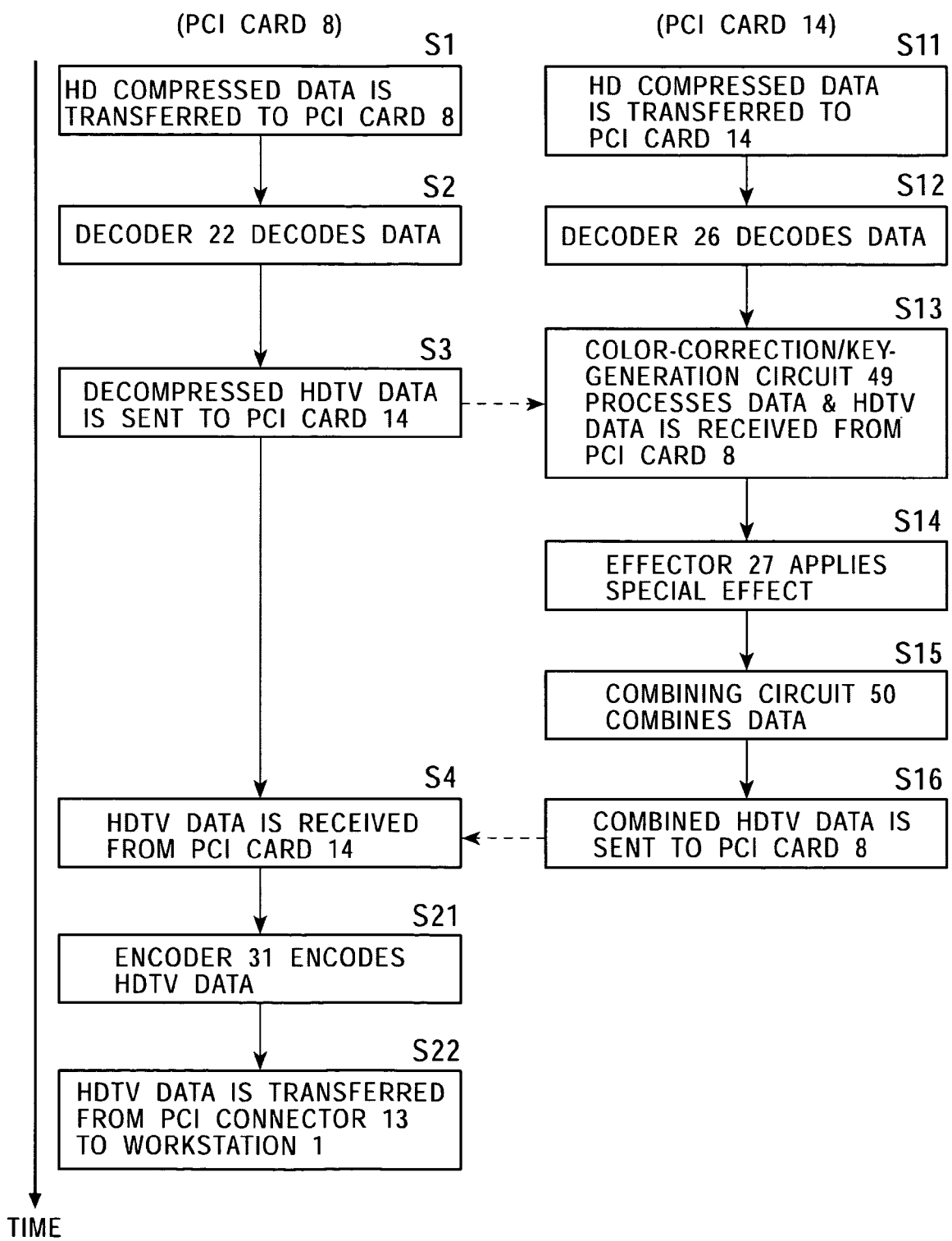
FIG. 8 is a timing chart showing the flow of an overall edit processing operation.

FIG. 8 is a timing chart showing the flow of an overall edit processing operation for material of each frame when a result of edit processing is selected with the editing-result output selection button so as to be stored in the storage device 2. The left-hand side in FIG. 8 shows the operation of the PCI card 8 and the right-hand side shows the operation of the PCI card 14.

Figure 9:
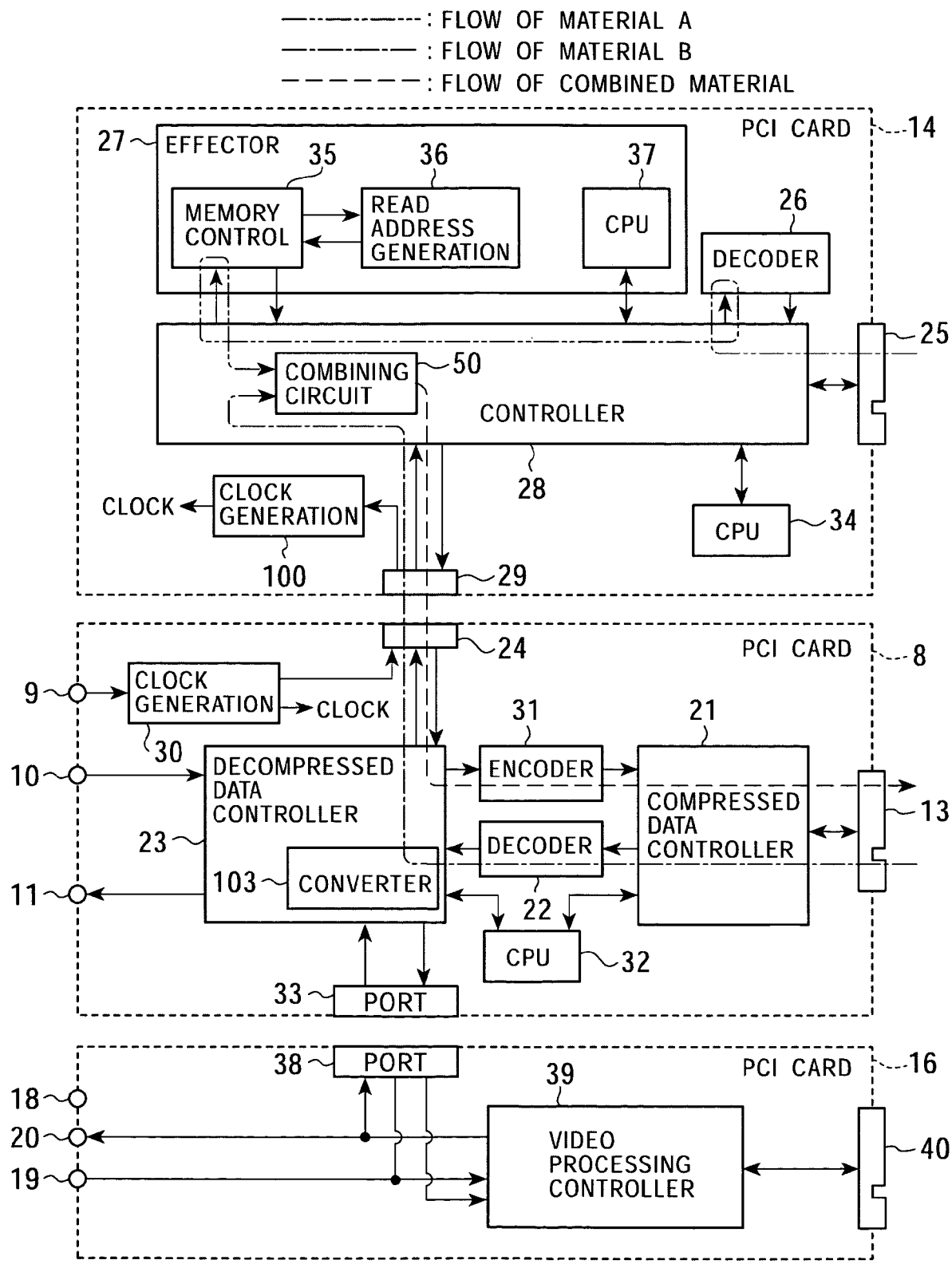
FIG. 9 is a block diagram showing the flow of material in the PCI cards during the edit processing operation shown in FIG. 8.

FIG. 9 is a block diagram showing the flow of materials within the PCI cards 8 and 14 during the edit processing operation shown in FIG. 8. The long dashed double-short dashed line indicates the flow of material A, the dashed-dotted line indicates the flow of material B, and the dotted line indicates the flow of material after materials A and B are combined.

In FIG. 8, since the processes from steps S1 to S4 for the PCI card 8 and the processes from steps S11 to S16 for the PCI card 14 are the same as those indicated by the same step numbers in FIG. 6, the redundant descriptions are omitted.

In the PCI card 8, subsequent to step S4, the combined HDTV video data transmitted from the PCI card 14 is sent from the decompressed-data controller 23 to the encoder 31 and is encoded within a time period for a predetermined number of frames (e.g., two frames) (in step S21).

In the PCI card 8, the encoded HDTV video data (HD compressed data) is sent from the encoder 31 to the compressed-data controller 21 within a time period for a predetermined number of frames (e.g., one frame) and is transferred from the PCI connector 13 to the workstation 1 via the PCI bus (in step S22).

At the workstation 1, the HD compressed data transferred from the PCI card 8 is stored in the storage device 2.

Figure 10:
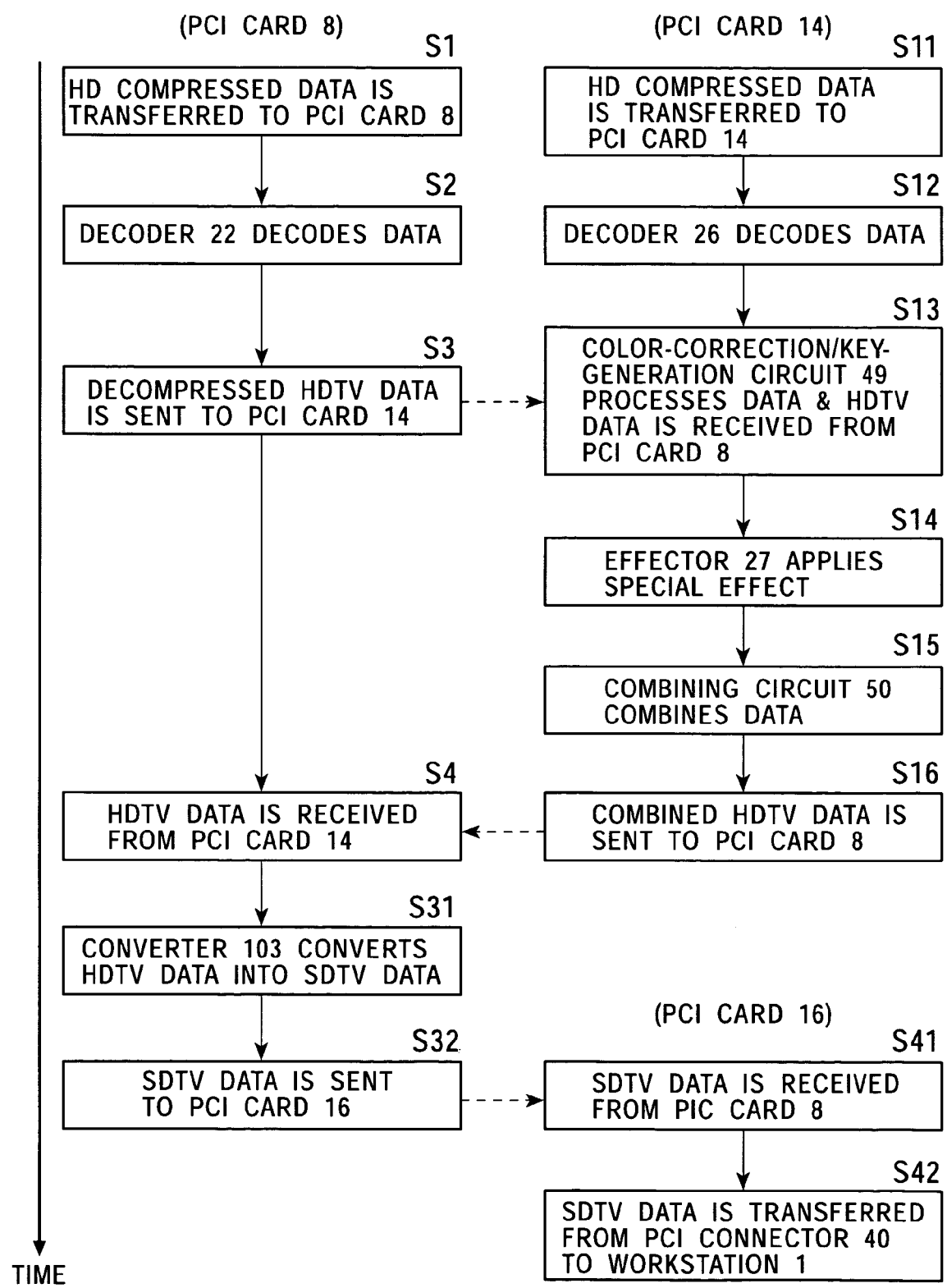
FIG. 10 is a timing chart showing the flow of an overall edit processing operation.

FIG. 10 is a timing chart showing the flow of an overall edit processing operation for material of each frame when a result of edit processing is selected with the editing-result output selection button so as to be displayed on the VGA monitor 5 or 6. The left-hand side in FIG. 10 shows the operation of the PCI card 8, the upper right side shows the operation of the PCI card 14, and the lower right side shows the operation of the PCI card 16.

Figure 11:
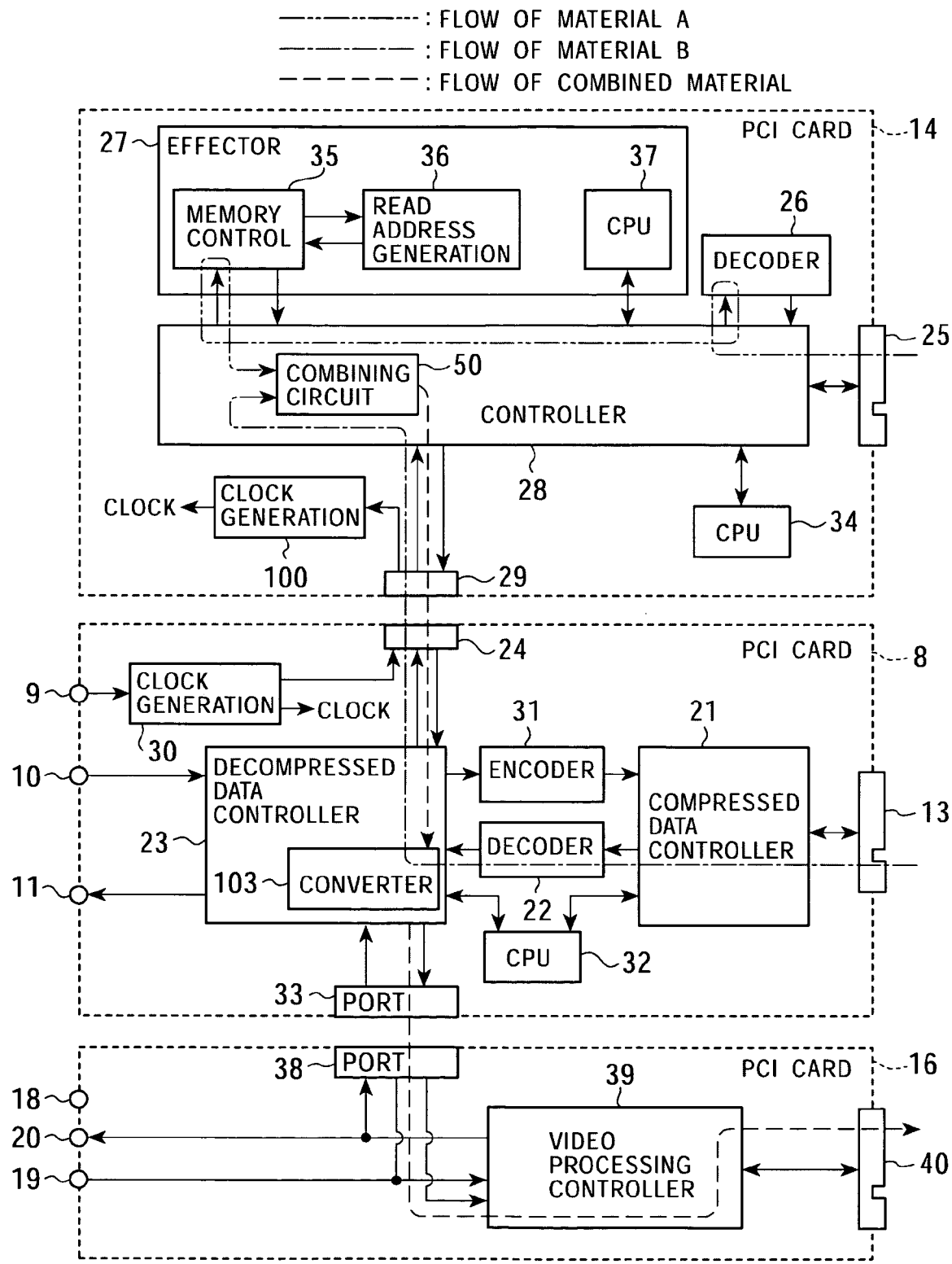
FIG. 11 is a block diagram showing the flow of material in the PCI cards during the edit processing operation shown in FIG. 10.

FIG. 11 is a block diagram showing the flow of materials within the PCI cards 8, 14, and 16 during the edit processing operation shown in FIG. 10. The long dashed double-short dashed line indicates the flow of material A, the dashed-dotted line indicates the flow of material B, and the dotted line indicates the flow of material after materials A and B are combined.

In FIG. 10, since the processes from steps S1 to S4 for the PCI card 8 and the processes from steps S11 to S16 for the PCI card 14 are the same as those indicated by the same step numbers in FIG. 6, the redundant descriptions are omitted.

In the PCI card 8, subsequent to step S4, within a time period for a predetermined number of frames, the combined HDTV video data sent from the PCI card 14 is converted by the converter 103 in the decompressed-data controller 23 into SDTV video data (in step 31).

In the PCI card 8, within a time period for a predetermined number of frames, the SDTV video data is sent from the decompressed-data controller 23 to the PCI card 16 via the port 33 (in step S32).

In the PCI card 16, the SDTV video data sent from the PCI card 8 is input to the video processing controller 39 via the port 38 (in step S41).

In the PCI card 8, within a time period for a predetermined number of frames, the SDTV video data is transferred from the PCI connector 40 to the workstation 1 via the PCI bus (in step S42).

At the workstation 1, the SDTV data transferred from the PCI card 16 is displayed on the VGA monitor 5 or 6.

As described above, HD compressed data for one frame are transferred, in each time period for one frame, from the workstation 1 to the PCI cards 8 and 14, and the transferred HD compressed data for each frame are sequentially subjected to the edit processing (shown in FIGS. 6, 8, or 10) that is performed by the PCI cards 8 and 14 or the PCI cards 8, 14, and 16. Thus, edit processing involving a special-effect-applied scene change (e.g., a scene change in which the scene of material A changes into the scene of material B while disappearing in a page-turning manner) is performed in real time.

A description will now be given of an editing process in which an operator edits material using the editing system. When an operator operates the material selection button, the special-effect selection button, and the editing-result output selection button on the operation screen and performs an operation for giving an instruction for starting edit processing, HD compressed data selected as material A (material to be subjected to a special effect) and material B (material to be combined with material A) with the material selection button are sequentially transferred for each frame in parallel from the workstation 1 to the PCI cards 14 and 18 via the PCI bus (in steps S1 and S11 in FIGS. 6, 8, and 10). The transferred HD compressed data are decoded in parallel by the corresponding decoders 26 and 22 (in steps S2 and S12 in FIGS. 6, 8, and 10).

The HDTV video data for each frame which has been decoded by the decoder 26 is sequentially subjected to a special effect by the effector 27. The HDTV video data for each frame which has been subjected to a special effect and HDTV video data for each frame decoded by the decoder 22 are sequentially combined by the combining circuit 50 in the controller 28 (in steps S14 to S16 in FIGS. 6, 8, and 10). As a result, material A and material B are subjected to the edit processing in real time.

When a result of edit processing is selected with the editing-result output selection button so as to be displayed on the HDTV monitor 101, the result is output from the PCI card 8 to the HDTV monitor 101 (in step S5 in FIG. 6) and is displayed on the HDTV monitor 101.

When a result of edit processing is selected with the editing-result output selection button so as to be stored in the storage device 2, the result is transferred as HD compressed data from the PCI card 8 to the workstation 1 (in steps S21 and S22 in FIG. 8) and is stored in the storage device 2 by the workstation 1.

When a result of edit processing is selected with the editing-result output selection button so as be displayed on the VGA monitor 5 or 6, the result is transferred as SDTV data from the PCI card 14 to the workstation 1 via the PCI card 16 (in steps S31, S32, S41, and S42 in FIG. 10) and is displayed on the VGA monitor 5 or 6 by the workstation 1.

As described above, in this editing system, HDTV data compressed in the HDCAM format is stored in the storage device 2 as material. Subsequently, two pieces of material (compressed HDTV video data) selected, as material to be edited, from the stored material are transferred in parallel from the workstation 1 to the PCI cards 8 and 14 installed in the workstation 1. The two pieces of material are decoded in parallel by the PCI cards 8 and 14 and are subjected to edit processing.

In this manner, regardless of a limited bandpass of the PCI bus, two pieces of HDTV data can be transferred in parallel from the workstation 1 to the PCI cards 8 and 14 so as to be subjected to edit processing. Thus, an HDTV signal can be edited in real time without use of dedicated large hardware other than the workstation 1.

Further, edit processing involving a special-effect-applied scene change can be performed in real time.

In addition, a result of edit processing can be displayed as an HDTV image on the HDTV monitor 101 so as to be checked in real time, can be stored in the storage device 2 as compressed HDTV video data, and can be displayed on the VGA monitor 5 or 6 connected to the workstation 1 so as to be checked in real time.

Additionally, since the PCI card 8 has the HD input connector 10, the decompressed-data controller 23 in the PCI card 8 can be configured to select either HDTV data input from the input connector 10 or HDTV data decoded by the decoder 22 (for example, this selection may be done on the operation screen displayed by the editing application software) and to send the selected HDTV data to the PCI card 14 via the connector 24.

Thus, not only can HD compressed data stored in the storage device 2 be transferred as material B from the workstation 1 to the PCI card 8, but also uncompressed HDTV. data can be directly input as material B from an external unit to the PCI card 8 directly so as to be subjected to edit processing.

In the above described example, the effector 27 for applying a special effect is provided in the PCI card 14 to perform edit processing for a special-effect-applied scene change. The present invention, however, is not limited to this configuration. For example, appropriate edit processing (e.g., A/B roll editing) may be performed in the PCI card 14.

In the above-described example, two pieces of HDTV video data compressed in the HDCAM format are transferred in parallel to the PCI cards 8 and 14 and are decoded in parallel by the PCI cards 8 and 14. The present invention, however, is not limited to this configuration. For example, two pieces of HDTV video data compressed in a format other than the HDCAM format may be transferred in parallel to the PCI cards 8 and 14 and be decoded in parallel by the PCI cards 8 and 14. That is, instead of the decoders 22 and 26 and the encoder 31, decoders and an encoder for that format may be provided.

In the above-described example, three PCI cards, i.e., the PCI cards 8, 14, and 16, are installed in the workstation 1. However, as an alternative, a single PCI card manufactured to have both functions of the PCI cards 8 and 14 may be installed in the workstation 1, instead of the PCI cards 8 and 14.

Alternatively, a single PCI card manufactured to have all the functions of the PCI cards 8, 14, and 16 may be installed in the workstation 1, instead of the PCI cards 8, 14, and 16.

In the above-described example, two pieces of HD compressed data are transferred in parallel from the workstation 1 to the PCI cards and are decoded in parallel by the PCI cards so as to be subjected to edit processing. The present invention, however, is not limited to this example. For example, a device other than the PCI cards may be installed in the workstation 1 such that the two pieces of HD compressed data are transferred in parallel from the workstation 1 to the device and are decoded in parallel by the device so as to be subjected to edit processing.

In the above-described example, the workstation is used for the nonlinear editor, material (HD compressed data) is stored in the storage device and material is transferred from the VTR. The present invention, however, is not limited to this example. For example, a personal computer may be used for the nonlinear editor, material may be stored on a hard disk built into the computer, and material may be transferred from a video camera or a video server.

Additionally, the present invention is not limited to the above-described examples, and can take various other forms without departing from the spirit and scope of the present invention.

What is claimed is:

1. An editing device to edit a high-definition television signal, the editing device comprising:
    a first decoder and a second decoder which decompress respective compressed high-definition television video data transferred from the computer; and
    edit processing means for performing edit processing on the high-definition television video data decompressed by the first decoder and the high-definition television video data decompressed by the second decoder, a result of edit processing performed by the edit processing means being output, wherein the edit processing means comprises:
    an effector for applying a special effect to the high-definition television video data decompressed by the first decoder,
    wherein the high-definition television video data decompressed by the first decoder and the high-definition television video data decompressed by the second decoder for one frame, are transferred, in each time period for one frame, in parallel to a first PCI card and a second PCI card, respectively,
    wherein the edit processing means and first decoder are contained on the first PCI card, and the second decoder is contained on the second PCI card, the first PCI card being directly connected to the second PCI card, and
    wherein the first PCI card and the second PCI card have PCI connectors for connecting with a motherboard of the computer by the PCI connectors, and are installed in PCI slots of the computer; and
    selection means for selecting a type of special effect and inputting an effect parameter,
    wherein, when the type of special effect is selected and the effect parameter is input via special effect selection button on an operation screen of the computer:
    an effect starting command is sent to the first PCI card from the computer;
    the effect parameter is stored in a memory of the computer;
    the effect starting command is then sent to the edit processing means from the first PCI card;
    the edit processing means then sends the effect starting command to a central processing unit of the computer;
    the central processing unit causes the effect parameter that is stored in the memory of the computer to be sent to the edit processing means;
    the edit processing unit writes the effect parameter to a memory of the edit processing unit;
    the central processing unit writes a calculation starting instruction to the memory of the edit processing unit;
    the effector reads the calculation starting instruction and reads the effect parameter from the memory of the edit processing unit and calculates a read address of data for each pixel using the effect parameter;
    the effector then changes a status in the memory of the effector indicating that the high-definition television video data decompressed by the first decoder is able to be received;
    the central processing unit then reads the status in the memory of the effector and causes the high-definition television video data decompressed by the first decoder to be sent to the effector;
    the effector performs processing per one frame of the high-definition television video data decompressed by the first decoder within a time period for a predetermined number of frames.

2. The editing device according to claim 1, wherein the edit processing means comprises:
    combining means for combining the high-definition television video data to which the special effect is applied by the effector and the high-definition television video data decompressed by the second decoder.

3. The editing device according to claim 1, further comprising:
    an output connector for high-definition television data,
    wherein the result of edit processing performed by the edit processing means is output from the output connector.

4. The editing device according to claim 1, further comprising:
an encoder for compressing the high-definition television video data on which the edit processing is performed by the edit processing means,
wherein the high-definition television video data compressed by the encoder is transferred to the computer.

5. The editing device according to claim 1, further comprising:
converting means for converting the high-definition television video data on which the edit processing is performed by the edit processing means into standard-definition television video data,
wherein the standard-definition television video data converted by the converting means is transferred to the computer.

6. The editing device according to claim 1, further comprising:
an input connector for uncompressed high-definition television data; and
selecting means for selecting one of high-definition television video data input from the input connector and the high-definition television video data decompressed by the first decoder and for supplying the selected high-definition television data to the edit processing means,
wherein the edit processing means performs edit processing on the high-definition television video data selected by the selecting means and the high-definition television video data decompressed by the second decoder.

7. The editing device according to claim 1, wherein the editing device comprises at least one peripheral component interconnect card.

8. An editing apparatus for a high-definition television signal, the editing apparatus comprising:
a computer for transferring compressed first high-definition television video data and compressed second high-definition television video data; and
an editing device that includes a first decoder and a second decoder which decompress the compressed first and second high-definition television video data, respectively, and edit processing means for performing edit processing on the decompressed first high-definition television video data and the decompressed second high-definition television video data, a result of edit processing performed by the edit processing means being output,
wherein the editing device comprises:
an effector for applying a special effect to the high-definition television video data decompressed by the first decoder,
wherein the compressed first high-definition television video data and the compressed second high-definition television video data for one frame, are transferred, in each time period for one frame, in parallel from the computer to a first PCI card and a second PCI card, respectively, wherein the edit processing means and first decoder are contained on the first PCI card, and the second decoder is contained on the second PCI card, the first PCI card being directly connected to the second PCI card, and
wherein the first PCI card and the second PCI card have PCI connectors for connecting with a motherboard of the computer by the PCI connectors, and are installed in PCI slots of the computer; and
a selection unit for selecting a type of special effect and inputting an effect parameter,
wherein, when the type of special effect is selected and the effect parameter is input via special effect selection button on an operation screen of the computer:
an effect starting command is sent to the first PCI card from the computer;
the effect parameter is stored in a memory of the computer;
the effect starting command is then sent to the edit processing means from the first PCI card;
the edit processing means then sends the effect starting command to a central processing unit of the computer;
the central processing unit causes the effect parameter that is stored in the memory of the computer to be sent to the edit processing means;
the edit processing unit writes the effect parameter to a memory of the edit processing unit;
the central processing unit writes a calculation starting instruction to the memory of the edit processing unit;
the effector reads the calculation starting instruction and reads the effect parameter from the memory of the edit processing unit and calculates a read address of data for each pixel using the effect parameter;
the effector then changes a status in the memory of the effector indicating that the high-definition television video data decompressed by the first decoder is able to be received;
the central processing unit then reads the status in the memory of the effector and causes the high-definition television video data decompressed by the first decoder to be sent to the effector;
the effector performs processing per one frame of the high-definition television video data decompressed by the first decoder within a time period for a predetermined number of frames.

9. The editing apparatus according to claim 8,
wherein the edit processing means comprises:
combining means for combining the high-definition television video data to which the special effect is applied by the effector and the high-definition television video data decompressed by the second decoder.

10. The editing apparatus according to claim 8,
wherein the editing device further comprises:
an output connector for high-definition television data,
the result of edit processing performed by the edit processing means being output from the output connector.

11. The editing apparatus according to claim 8,
wherein the editing device further comprises:
an encoder for compressing the high-definition television video data on which the edit processing is performed by the edit processing mean, the high-definition television video data compressed by the encoder being transferred to the computer.

12. The editing apparatus according to claim 8,
wherein the editing device further comprises:
converting means for converting the high-definition television video data on which the edit processing is performed by the edit processing means into standard-definition television video data,
the standard-definition television video data converted by the converting means being transferred to the computer.

13. The editing apparatus according to claim 8,
wherein the editing device further comprises:
an input connector for uncompressed high-definition television data; and
selecting means for selecting one of high-definition television data input from the input connector and the high-definition television video data decompressed by the first decoder and for supplying the selected high-definition television data to the edit processing means, and wherein the edit processing means performs edit processing on the high-definition television video data selected by the selecting means and the high-definition television video data decompressed by the second decoder.

14. The editing apparatus according to claim 8, wherein the editing device comprises at least one peripheral component interconnect card.

15. An editing method for editing a high-definition television signal using a computer, the editing method comprising:

a transferring step of transferring compressed first high-definition television video data and compressed second high-definition television video data for one frame, in each time period for one frame, in parallel from the computer to a first PCI card and a second PCI card, respectively;

a decompressing step of decompressing, in the editing device, the compressed first high-definition television video data and the compressed second high-definition television video data which are transferred in the transferring step;

an editing step of performing, in the editing device, edit processing on the first high-definition television video data and the second high-definition television video data which are decompressed in the decompressing step, wherein the editing step comprises:

an applying step for applying a special effect to the high-definition television video data decompressed by the first decoder; and an outputting step of outputting a result of edit processing performed in the editing step from the editing device, wherein the editing step and the decompressing of the compressed first high-definition television video data occur on the first PCI card, and the decompressing of the second high-definition television video data occurs on the second PCI card, the first PCI card being directly connected to the second PCI card, and wherein the first PCI card and the second PCI card have PCI connectors for connecting with a motherboard of the computer by the PCI connectors, and are installed in PCI slots of the computer; and a selection step for selecting a type of special effect and inputting an effect parameter, wherein, when the type of special effect is selected and the effect parameter is input via special effect selection button on an operation screen of the computer:

an effect starting command is sent to the first PCI card from the computer;

the effect parameter is stored in a memory of the computer;

the effect starting command is then sent to the edit processing means from the first PCI card;

the edit processing means then sends the effect starting command to a central processing unit of the computer;

the central processing unit causes the effect parameter that is stored in the memory of the computer to be sent to the edit processing means;

the edit processing unit writes the effect parameter to a memory of the edit processing unit, the central processing unit writes a calculation starting instruction to the memory of the edit processing unit;

the effector reads the calculation starting instruction and reads the effect parameter from the memory of the edit processing unit and calculates a read address of data for each pixel using the effect parameter;

the effector then changes a status in the memory of the effector indicating that the high-definition television video data decompressed by the first decoder is able to be received;

the central processing unit then reads the status in the memory of the effector and causes the high-definition television video data decompressed by the first decoder to be sent to the effector;

the effector performs processing per one frame of the high-definition television video data decompressed by the first decoder within a time period for a predetermined number of frames.

16. The editing method according to claim 15, wherein, in the editing step, a special effect is applied to the first high-definition television video data, and the first high-definition television video data to which the special effect is applied and the second high-definition television video data are combined.

17. The editing method according to claim 15, wherein, in the outputting step, the result of edit processing performed in the editing step is output from a high-definition television signal output-connector provided at the editing device.

18. The editing method according to claim 15, further comprising:

a compressing step of compressing, in the editing device, the high-definition television video data on which the edit processing is performed in the editing step, wherein, in the outputting step, the high-definition television video data compressed in the compressing step is transferred to the computer.

19. The editing method according to claim 15, further comprising:

a converting step of converting, in the editing device, the high-definition television video data on which the edit processing is performed in the editing step into standard-definition television video data, wherein, in the outputting step, the standard-definition television video data converted in the converting step is transferred to the computer.

20. The editing method according to claim 15, further comprising:

a selecting step of selecting, in the editing device, one of high-definition television video data input from an uncompressed high-definition television data input-connector provided at the editing device and the first high-definition television video data decompressed in the decompressing step, wherein, in the editing step, the high-definition television video data selected in the selecting step and the second high-definition television video data are subjected to edit processing.

21. The editing method according to claim 15, wherein the editing device comprises at least one peripheral component interconnect card.

* * * * *